US008154452B2

(12) United States Patent
Webb

(10) Patent No.: US 8,154,452 B2
(45) Date of Patent: Apr. 10, 2012

(54) METHOD AND APPARATUS FOR PHASED ARRAY ANTENNA FIELD RECALIBRATION

(75) Inventor: Kenneth M. Webb, North Hills, CA (US)

(73) Assignee: Raytheon Company, Waltham, MA (US)

( * ) Notice: Subject to any disclaimer, the term of this patent is extended or adjusted under 35 U.S.C. 154(b) by 352 days.

(21) Appl. No.: 12/499,765

(22) Filed: Jul. 8, 2009

(65) Prior Publication Data

US 2011/0006949 A1 Jan. 13, 2011

(51) Int. Cl.
*H01Q 3/00* (2006.01)
*G01S 7/40* (2006.01)

(52) U.S. Cl. ........................................ 342/368; 342/174

(58) Field of Classification Search .......... 342/368–377, 342/174
See application file for complete search history.

(56) References Cited

U.S. PATENT DOCUMENTS 5,122,806 A 6/1992 Julian
5,206,655 A * 4/1993 Caille et al. .................. 342/368
5,477,229 A 12/1995 Caille et al.
5,530,449 A 6/1996 Wachs et al.
5,644,316 A 7/1997 Lewis et al.
5,657,023 A 8/1997 Lewis et al.
5,682,165 A 10/1997 Lewis et al.
5,864,317 A 1/1999 Boe et al.
5,929,809 A 7/1999 Erlick et al.
5,929,810 A 7/1999 Koutsoudis et al.
5,933,113 A * 8/1999 Newberg et al. .............. 342/368
5,940,032 A 8/1999 Passmann et al.
6,084,545 A 7/2000 Lier et al.
6,127,966 A 10/2000 Erhage
6,133,868 A 10/2000 Butler et al.
6,157,340 A * 12/2000 Xu et al. ...................... 342/368
6,208,287 B1 3/2001 Sikina et al.
6,252,542 B1 6/2001 Sikina et al.

(Continued)

FOREIGN PATENT DOCUMENTS

EP 1 670 095 A1 6/2006

OTHER PUBLICATIONS

Y. Takeuchi et al., Auto calibrated distributed local loop configuration of array antenna for CDMA cellular base station, IEEE Sixth International Symposium on Spread Spectrum Techniques and Applications, vol. 2, p. 666-670, 2000.*

(Continued)

*Primary Examiner* — Thomas Tarcza
*Assistant Examiner* — Fred H Mull
(74) *Attorney, Agent, or Firm* — Christie, Parker & Hale, LLP

(57) ABSTRACT

A system and method for calibrating a modular phased array antenna after replacement of a component of the modular phased array antenna including a plurality of sub-arrays, each sub-array including a plurality of antenna elements. A complex correction coefficient is determined for correcting a phase and amplitude of one antenna element of the antenna elements in a first sub-array of the sub-arrays. This correction coefficient is then applied to a plurality of the antenna elements in the first sub-array. Therefore, automatic calibration of an entire sub-array of an electronically scanned antenna may be accomplished in the field without the requirement for special test equipment, and with a reduced time and energy requirement because calibration of each individual antenna element in the replaced sub-array is not required.

12 Claims, 5 Drawing Sheets

U.S. PATENT DOCUMENTS

| | | | |
|---|---|---|---|
| 6,356,233 | B1 | 3/2002 | Miller et al. |
| 6,417,769 | B1 | 7/2002 | Jan |
| 6,480,153 | B1 | 11/2002 | Jung et al. |
| 6,570,527 | B1 | 5/2003 | Lindskog et al. |
| 6,667,713 | B2 | 12/2003 | Green et al. |
| 6,690,952 | B2 | 2/2004 | Nishimori et al. |
| 6,738,020 | B1 | 5/2004 | Lindskog et al. |
| 6,747,595 | B2 | 6/2004 | Hirabe |
| 6,795,019 | B2 | 9/2004 | Holt |
| 6,833,812 | B2 | 12/2004 | Diament |
| 6,861,975 | B1 | 3/2005 | Coleman Jr. et al. |
| 6,891,497 | B2 | 5/2005 | Coleman, Jr. et al. |
| 6,900,775 | B2 | 5/2005 | Shapira |
| 6,927,725 | B2 | 8/2005 | Wittenberg et al. |
| 6,963,742 | B2 | 11/2005 | Boros et al. |
| 6,972,716 | B2 | 12/2005 | Davis et al. |
| 7,031,669 | B2 | 4/2006 | Vaidyanathan et al. |
| 7,039,016 | B1 | 5/2006 | Lindskog et al. |
| 7,081,851 | B1 | 7/2006 | Lewis |
| 7,116,267 | B2 | 10/2006 | Schuster et al. |
| 7,205,936 | B2 | 4/2007 | Park et al. |
| 7,236,750 | B2 | 6/2007 | Vaidyanathan et al. |
| 7,248,209 | B2 | 7/2007 | Shima et al. |
| 7,265,713 | B2 | 9/2007 | Lewis |
| 7,340,248 | B2 | 3/2008 | Kawasaki et al. |
| 7,362,266 | B2 | 4/2008 | Collinson |
| 2004/0015740 | A1 | 1/2004 | Dautelle |
| 2005/0179582 | A1 | 8/2005 | Woodington et al. |
| 2010/0117890 | A1 * | 5/2010 | Vook et al. .................... 342/174 |

OTHER PUBLICATIONS

Extended European Search Report for Corresponding European Application No. 10251208.4.0, extended European Search Report dated Nov. 10, 2010 and mailed Nov. 17, 2010 (7 pgs.).

Aumann H. M. et al., “Phased Array Antenna Calibration and Pattern Prediction Using Mutual Coupling Measurements”, IEEE Transactions on Antennas and Propagation, vol. 37, No. 7, Jul. 1989 (pp. 844-850).

* cited by examiner

METHOD AND APPARATUS FOR PHASED ARRAY ANTENNA FIELD RECALIBRATION

BACKGROUND

The present invention relates to the field of antennas, and more particularly, to the field repair and replacement of phased array antennas.

For phased array antennas, such as electronically scanned array (ESA) antennas, there is an emerging requirement to utilize modular arrays, in which standardized units or portions of the antenna (e.g., sub-arrays or a radio frequency (RF) feed network) are replaceable in the field as part of mission support. Driving this requirement is the desire to simplify and reduce the cost of repair or replacement of part of the antenna, for example, by reducing the size and cost of spares. Further, after replacement, the phase and amplitude of the antenna elements of a newly replaced sub-array, or those corresponding to a newly replaced feed network, must be calibrated (a process typically called phase-up). Thus, there is a desire in the art to eliminate the need to remove the entire antenna from the platform and either utilize special test equipment (STE) in the field or return it to the factory for recalibration or phase-up.

One conventional approach utilizes near field techniques through the use of a portable RF absorber aperture cover with an embedded horn feeding a network analyzer. The cover is placed over the aperture and a coarse measurement of the phase and gain of the replaced elements is made and used to align the new elements to the rest of the array. Another similar technique has horn antennas mounted on the edges of the aperture and the signals are processed within the system.

Still another approach is taught in U.S. Pat. No. 5,657,023 issued to Lewis et al., the entire content of which is incorporated herein by reference. Lewis provides for phase-up of array antennas of a regularly spaced lattice orientation, without the use of a nearfield or farfield range. The technique uses mutual coupling and/or reflections to provide a signal from one element to its neighbors. This signal provides a reference to allow for each antenna element to be phased-up with respect to one another.

Referring to FIG. 1A, as taught in Lewis et al., a line array includes antenna elements 1-5. The sequence begins by transmitting from element 1 as shown in FIG. 1A as transmission $T_1$, and simultaneously receiving a measurement signal R in element 2. A signal $T_2$ is then transmitted from element 3, and a measurement signal is received in element 2. The phase and gain response from element 2 in this case (reception of the transmitted signal from element 3) is compared to that for the previous measurement (reception of the transmitted signal from element 1). This allows the transmit phase/gain differences between elements 1 and 3 to be computed. While still transmitting from element 3, a receive measurement is then made through element 4. The differences in receive phase/gain response for elements 2 and 4 can then be calculated.

To finish the example depicted in FIG. 1A, a signal $T_3$ is transmitted from element 5 and a receive signal is measured in element 4. Data from this measurement allows element 5 transmit phase/gain coefficients to be calculated with respect to transmit excitations for elements 1 and 3.

The result of this series of measurements is computation of correction coefficients that when applied allow elements 2 and 4 to exhibit the same receive phase/gain response. Further, additional coefficients result that when applied, allow elements 1, 3 and 5 to exhibit the same transmit phase/gain response. Typically, the coefficients can be applied through appropriate adjustment of the array gain and phase shifter commands, setting attenuators and phase shifters.

In a line array of arbitrary extent, the measurement sequences of transmitting from every element and making receive measurements from adjacent elements continues to the end of the array. Thus the calibration technique can be applied to arbitrarily sized arrays. Receive measurements using elements other than those adjacent to the transmitting elements may also be used. These additional receive measurements can lead to reduced overall measurement time and increased measurement accuracy.

For an odd element receive phase-up the second series of measurements is aimed at phasing up the odd numbered elements in receive and even numbered elements in transmit. These measurement sequences are similar to those described above for the even element phase-up, and are illustrated in FIG. 1B.

First, a transmit signal from element 2 provides excitation for receive measurements from element 1 and then element 3. This allows the relative receive phase/gain responses of elements 1 and 3 to be calculated.

A transmit signal from element 4 is then used to make receive measurements from element 3 and then element 5. This allows the relative receive phase/gain response of elements 3 and 5 to be calculated. Also, the relative transmit response of element 4 with respect to element 2 can be calculated. All of the coefficients can then be used to provide a receive phase-up of the even elements and a transmit phase-up of the odd elements.

To complete the overall phase-up utilizing conventional practices, the interleaved phased-up odd-even elements need to be brought into overall phase/gain alignment. Coefficients are determined, which, when applied, achieve this alignment.

However, in accordance with the technique described in Lewis et al. each individual antenna element is measured and calibrated, which can be time consuming and energy wasting.

SUMMARY OF THE INVENTION

In one aspect, an exemplary embodiment of the present invention provides a method for calibrating a modular phased array antenna that reduces the time and energy required for calibration, and further enables calibration of the full array in the field after replacement of a sub-array or other component of the antenna without requiring special test equipment or necessarily requiring substantial training.

In another aspect, an exemplary embodiment of the present invention utilizes mutual coupled signals that are transmitted and received between one array element in an uncalibrated sub-array to another array element in another (already calibrated) sub-array to provide measurements of the phase and gain of antenna elements in the uncalibrated sub-array. Calibration offsets derived through this method then provide system level calibration regardless of which antenna sub-array or RF component of the antenna array is replaced.

Mutual coupled element to element calibration is used for measuring elemental phase and gain to calibrate an entire portion (i.e., sub-array) of the antenna array replaced in the field without an RF absorber cover, peripheral horns, or any external test equipment. It also provides calibration for other RF components in the antenna so they can be replaced in the field as part of mission support.

Embodiments of the present invention provide both significant cost savings in field calibration and during factory/depot test. Embodiments of the present invention can also be extended to the calibration of hardware between the antenna output and receiver input, such as switch assemblies and cables. Repair and replacement of failed units without the use of special field test equipment is a key requirement of most new radar developments.

In accordance with one exemplary embodiment of the present invention, a modular phased array antenna includes a plurality of sub-arrays, each of the sub-arrays having a plurality of antenna elements. First, a correction coefficient is determined for calibrating a first antenna element of the antenna elements in the first sub-array. The correction coefficient is then applied to a plurality of the antenna elements in the sub-array, for example, each of the antenna elements in the sub-array.

In some embodiments, the method is applied after replacement of the first sub-array. In other embodiments, the method is applied after replacement of other components, such as part or parts of a feed network (e.g., a time delay unit) providing signals to/from the first sub-array.

In a further exemplary embodiment, the determination of the correction coefficient includes first determining intermediate correction coefficients for each of a plurality of the antenna elements in the first sub-array, and then calculating an average correction coefficient corresponding to those intermediate correction coefficients. The average correction coefficient is then applied to a plurality (e.g., each) of the antenna elements in the first sub-array.

In a further exemplary embodiment, in the first sub-array, a first antenna element has a first receiving phase and gain and a first transmitting phase and gain. Second and third sub-arrays also include antenna elements having their own respective transmitting and receiving phase and gain. To determine a receiving correction coefficient for calibrating the first sub-array in a receive mode, the correction coefficient (i.e., the receiving correction coefficient) is determined by transmitting signals along mutual coupling paths, each having respective mutual coupling characteristics (e.g., each mutual coupling path having equivalent mutual coupling characteristics), from the second sub-array to each of the third sub-array and the first sub-array. The receiving correction coefficient then corresponds to a difference between characteristics of the signal received by the first sub-array, which is to be calibrated, and the third sub-array, which is assumed to already be in calibration. The receiving correction coefficient may then be applied to a plurality (e.g., each) of the antenna elements in the first sub-array.

In an even further exemplary embodiment, the signals transmitted along the mutual coupling paths from the second sub-array to the first and third sub-arrays correspond to changes in an amplitude and a phase of the signals sent to the second sub-array, those changes corresponding to the transmitting phase and gain of the transmitting antenna element of the second sub-array, the mutual coupling characteristics of the respective mutual coupling paths, and the receiving phase and gain of the respective receiving antenna elements of the first and third sub-arrays.

In another embodiment for determining a transmitting correction coefficient for the first sub-array, the first sub-array and a fourth sub-array respectively transmit signals along mutual coupling paths to a fifth sub-array. The transmitting correction coefficient thereby corresponds to a difference between the signal received at the fifth sub-array from the first sub-array and the one received from the fourth sub-array. The transmitting correction coefficient may then be applied to a plurality (e.g., each) of the antenna elements in the first sub-array.

DETAILED DESCRIPTION

Given a modular electronically scanned array (ESA) or phased array antenna with an architecture having standardized units or components of the antenna that are replaceable with spare components, after replacement the antenna generally requires recalibration. For example, an antenna array may include multiple sub-arrays, each including a number of antenna elements, wherein the sub-arrays are field replaceable. Moreover, a feed network or other components coupled to the sub-arrays may be replaceable in the field. In many cases the replacement of any of these components can bring the sub-array to which they are coupled out of calibration.

In conventional systems for recalibration of ESAs utilizing mutual coupling, it was assumed that every antenna element required calibration. Thus, conventional systems suffered from an increased computational load, more required power, an increased calibration time, and an increased use of the hardware, potentially reducing its lifetime. Embodiments of the invention achieve calibration of the whole array in the field utilizing only one element, or a subset of the elements in the replaced sub-array to determine the offset required to align the global phase and amplitude of the sub-arrays.

Figure 1A:
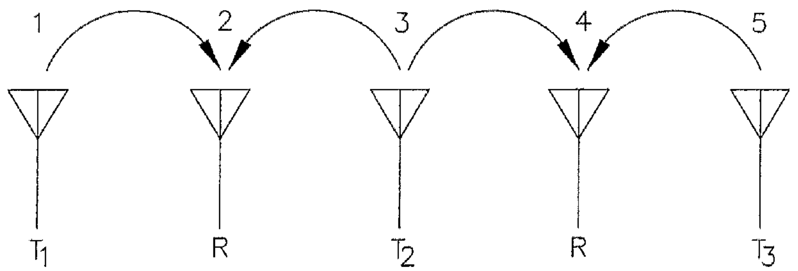
FIG.1A PRIOR ART
FIGS. 1A and 1B show a conventional transmit and receive calibration of a linear antenna array.
Figure 1B:
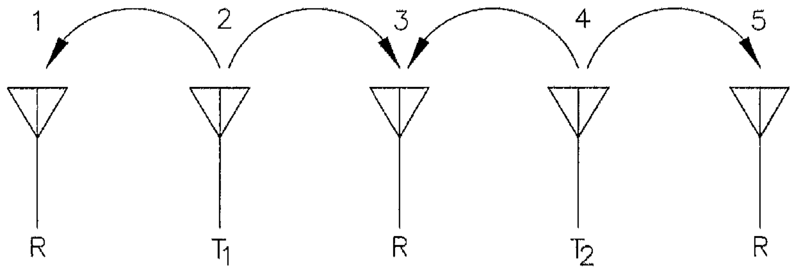
FIG.1B PRIOR ART
Figure 2:
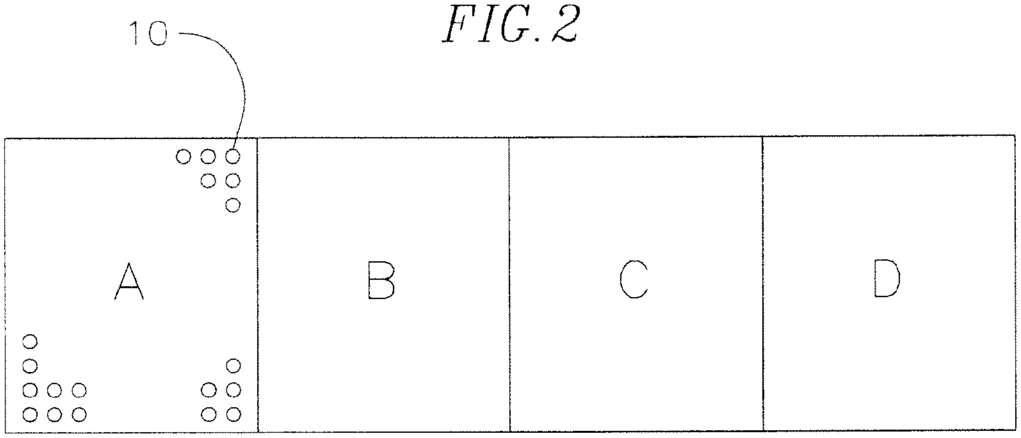
FIGS. 2 and 3 show a modular electronically scanned array antenna being recalibrated in accordance with an exemplary embodiment of the present invention.

In accordance with an exemplary embodiment of the present invention, mutual coupled measurements are utilized to calibrate a replaced (or otherwise out of calibration) sub-array in accordance with the rest of the array during a field maintenance procedure without requiring external special test equipment (STE). FIG. 2 shows a diagram of an ESA antenna array with four contiguous line replaceable sub-arrays A-D. Each of the sub-arrays A-D includes an array of antenna elements 10.

Figure 3:
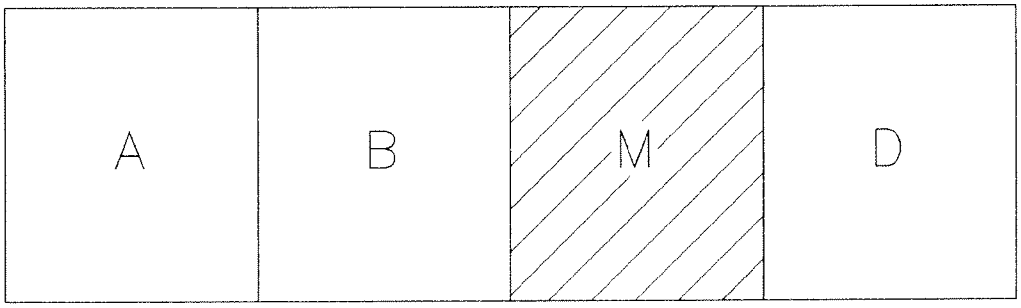

In a maintenance procedure where, for example, sub-array C is replaced by a spare sub-array M as seen in FIG. 3, the elements in sub-array M will be out of calibration with respect to the elements of sub-array A, the elements of sub-array B, or the elements of sub-array D, because it can be assumed that sub-array M was not calibrated at the same time, with the same hardware, or in the same relative position in the array as sub-array C.

With sub-array M in the array, mutual coupled measurements to and from elements in neighboring sub-arrays, such as sub-array B and sub-array D can be used to determine correction coefficients required to bring sub-array M into alignment with the rest of the array.

In accordance with an exemplary embodiment of the present invention, the polarization of the antenna is linear, uniform, and aligned with the lattice, with the E plane (i.e., the plane of the electric field of the electromagnetic wave) being vertical such that the signals are symmetric around the E polarization. Mutual coupled signals traveling the same distance along symmetric vectors in the electromagnetic field have the same electromagnetic characteristics. This is graphically shown in an exemplary embodiment depicted in FIG. 4, where antenna array elements 1-8 either transmit or receive a signal as vector γ.

Figure 4:
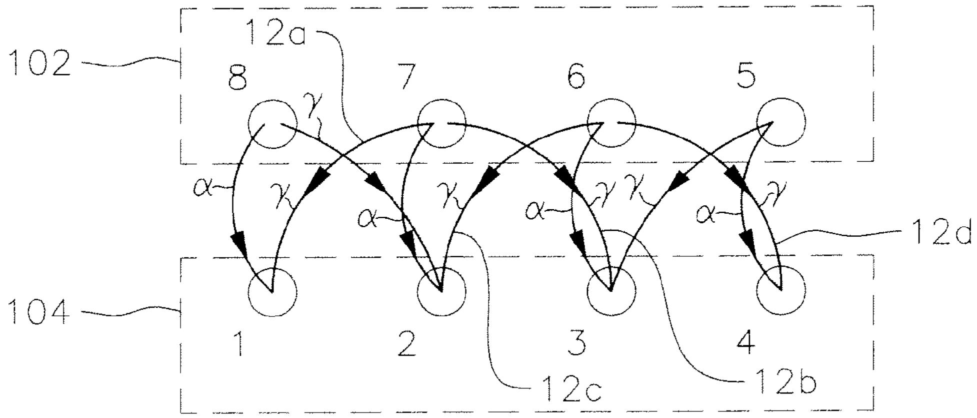
FIG. 4 shows mutual coupled signal representations in accordance with an exemplary embodiment of the present invention.

FIG. 4 illustrates a first sub-array 102 and a second sub-array 104. First sub-array 102 includes antenna elements 5, 6, 7, and 8, and second sub-array 104 includes antenna elements 1, 2, 3, and 4. In the illustrated embodiment, element 7 is transmitting signals 12*a* and 12*b* as vectors γ to be respectively received by elements 1 and 3. Similarly, element 6 is transmitting signals 12*c* and 12*d* as other vectors γ to be respectively received by elements 2 and 4.

A mutual coupled signal starts with a single element transmitting a signal, which is modified according to the transmitting phase and gain of the transmitting antenna element. The transmitted signal travels as a vector γ along a mutual coupling path in the electromagnetic field, which modifies its phase and gain according to the characteristics of the channel, i.e., the mutual coupling characteristics of the mutual coupling path. Then the signal is received by the receiving element, which further modifies the signal in accordance with its receiving phase and gain. The signal is then mixed down to its in-phase and quadrature components and reduced to a complex number, capturing both phase and gain information.

It is convenient to represent any mutual coupled signal graphically by the three components that affect the signal. Equations [EQ. 1] and [EQ. 2] below characterize the four signals 12*a*-12*d* depicted in FIG. 4. For example, "T7 γ R1" represents the signal 12*a* transmitted from element 7 (with a phase and gain modified by the transmission characteristics of element 7) along vector γ (further modifying the phase and gain according to the characteristics of the channel) and received by element 1 (further modifying the phase and gain according to the receiver characteristics of element 1). Using signal algebra as taught in Lewis et al. to determine the necessary complex math, correction coefficients C1 and C2 can be generated.

$$C1 = \frac{T7 \cdot \gamma \cdot R1}{T7 \cdot \gamma \cdot R3} = \frac{R1}{R3} \quad \text{[EQ. 1]}$$

$$C2 = \frac{T6 \cdot \gamma \cdot R2}{T6 \cdot \gamma \cdot R4} = \frac{R2}{R4} \quad \text{[EQ. 2]}$$

The simplified signal algebra of [EQ. 1] and [EQ. 2] shows the generation of correction coefficients C1 and C2, which can be applied to element number 3 in FIG. 4 to bring it into phase and gain alignment in receive with element number 1, and similarly, for phasing up element 4 to element 2 in receive. That is, to bring element 3 into calibration with element 1 in receive, the correction coefficient C1 is applied to element 3 in the following fashion when signals are received by element 3:

$$\frac{R1}{R3} \cdot R3 = C1 \cdot R3 = R'3 = R1 \quad \text{[EQ. 3]}$$

In some embodiments of the invention, phasing up or calibration of a plurality of antenna elements in the second sub-array 104 (e.g., the entire sub-array 104) is improved by utilizing additional mutual coupled signals along paths α. That is, as illustrated in FIG. 4, further signals are transmitted from antenna elements 8 and 7 to antenna elements 1 and 2, respectively, along the mutual coupling paths α.

$$\frac{T8 \cdot \gamma \cdot R2}{T7 \cdot \gamma \cdot R1} \cdot \frac{T7 \cdot \alpha \cdot R2}{T8 \cdot \alpha \cdot R1} = \left(\frac{R2}{R1}\right)^2 \quad \text{[EQ. 4]}$$

As is seen in EQ. 4, by utilizing the signals along the mutual coupling paths α between antenna elements 8 and 1, and antenna elements 7 and 2, by the signal algebra, characteristics other than the receive characteristics of elements 1 and 2 are cancelled out, resulting in a complex number of the square of the ratio between R2 and R1. Accordingly, by taking the complex square root of the result, one obtains the ratio between the receive characteristics of elements 2 and 1. In this way, element 1 becomes a reference element, so that elements 24 can be calibrated in accordance with element 1.

In some embodiments of the invention, to expedite calibration, the procedure shown in EQ. 3 is utilized to determine the compensation coefficient for one antenna element in transmit, and one element (not necessarily the same element) in receive, and these compensation coefficients are thereby applied to a plurality of elements in the replaced sub-array M. In other embodiments, compensation coefficients for a plurality of elements in the replaced sub-array M can be determined, and a global (e.g., an average) compensation coefficient can be generated to bring sub-array M into calibration with the rest of the antenna array.

Figure 5:
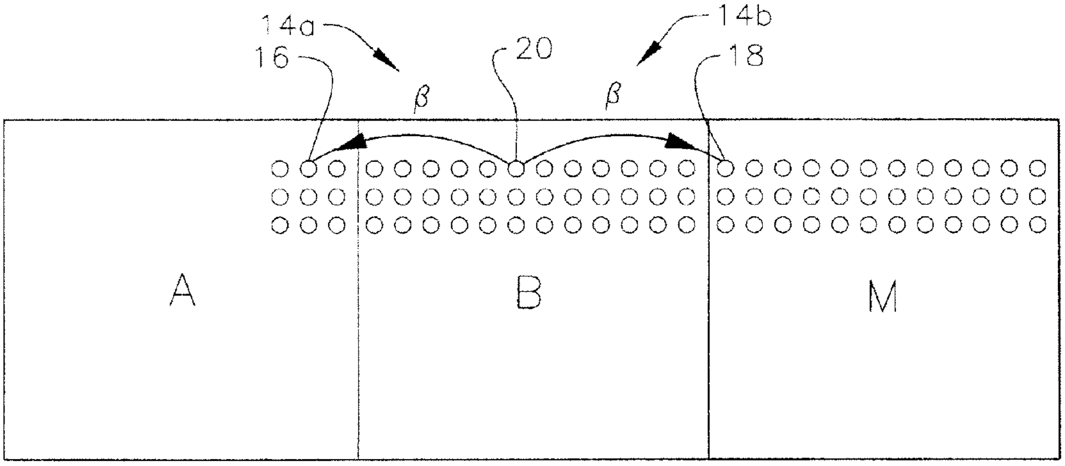
FIG. 5 shows mutual coupled signal representations in accordance with an exemplary embodiment of the present invention for linearly adjacent sub-arrays.

Referring now to FIG. 5, there is shown a typical lattice spacing of antenna elements within three sub-arrays A, B, and M, with an exemplary mutual coupled signal pair transmission of signal vectors 14*a* and 14*b*. The pair of signals 14*a* and 14*b* can be created by transmitting to sub-array A and to sub-array M from the same element 20 in the sub-array B. If there is enough isolation between transmit and receive feeds to allow for mutual coupled element pairs to be in the same sub-array, then mutual coupled path lengths can be shortened (see FIG. 8, discussed in more detail below) such that neighboring elements within the same sub-array can be used. Of course, the element 18 should be in a different sub-array than either of the antenna elements 20 and 16 being used to calibrate element 18.

The receiving elements 16 and 18 are equidistant from the transmitting element 20 and along symmetric electromagnetic field vectors such that the mutual coupling characteristics are the same. Any number of elements may be used to mitigate problems caused by element failures, multipath signals, radome nulls, and other unwanted effects. Further, averaging of compensation characteristics across a number of elements in a replaced sub-array can be utilized to further reduce error effects.

The resulting signal algebra would look similar to that shown above in [EQ. 1] and [EQ. 2]. The resulting complex offset would bring the element 18 in sub-array M into calibration with the element 16 in sub-array A in a receive operation.

To calibrate the replaced sub-array for a transmit operation, a process similar to a reverse of the above process is utilized. That is, to bring element 18 into calibration in transmission, elements 18 and 16 transmit signals along the mutual coupling paths β, and element 20 receives the mutual coupled signals from elements 18 and 16. In this way, the offset in gain and phase of element 18 relative to element 16 can be determined corresponding to the mutual coupled signals received from elements 18 and 16 by element 20. Thereafter, as discussed above, a calculated correction coefficient is applied to element 18 in transmit to bring it into calibration in transmission relative to element 16.

Improved accuracy for the calibration coefficient in either transmit or receive modes is achieved by utilizing multiple measurements as described above with many element pairs, and averaging the results to mitigate errors and unwanted effects. According to various embodiments, calculation of the average can include calculation of the arithmetic mean, the geometric mean, the median, mode, or any other value resulting from a combination of the plurality of correction coefficients that a designer may find suitable. Thus, in contrast to the prior art, in which every transmit and receive element has a unique calibration offset such that there is nothing to average, embodiments of the invention enhance calibration of the array as a whole.

Figure 6:
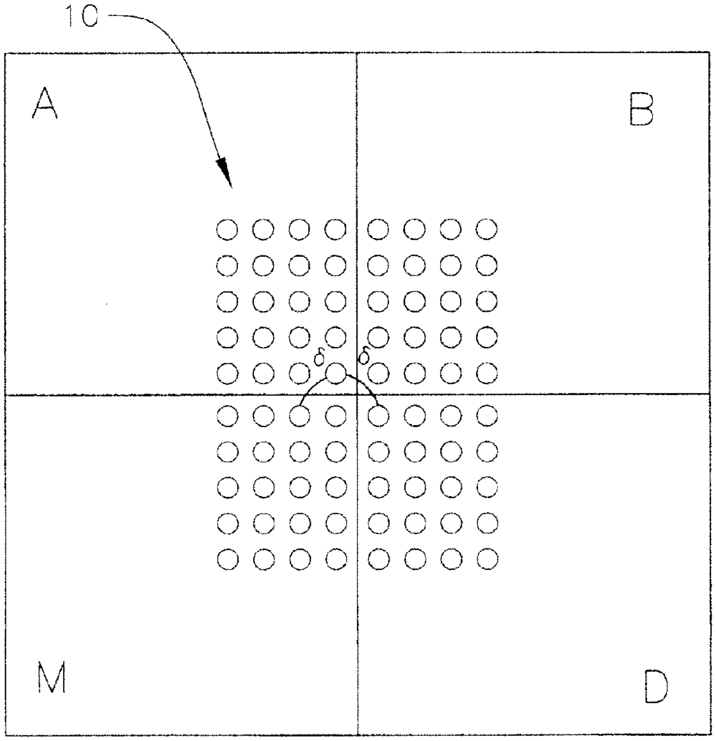
FIG. 6 shows mutual coupled signal representation in accordance with an exemplary embodiment of the present invention for quadraturely adjacent sub-arrays.

Another exemplary embodiment of the present invention can be applied to an antenna with a quadrature style sub-array architecture. FIG. 6 shows an equivalent diagram to that of FIG. 5 but for a quadrature architecture. Again, the signal algebra would be similar to equations [EQ. 1] and [EQ. 2] and would provide complex correction coefficients that would align the antenna elements 10 within sub-array M with those of sub-array D. Using other symmetries, sub-array M could be calibrated to sub-array A as well to reduce errors.

Further, while some embodiments of the present invention are utilized to calibrate pieces of the front of the antenna array, that is, the transmit/receive (T/R) antenna sub-arrays, other embodiments are utilized to calibrate both active and passive components of a feed network behind the aperture. For example, an architecture that contains time delay units (TDUs) could require the replacement of one TDU in the field. Thus, an embodiment of the invention determines the proper calibration coefficients to apply to the sub-array coupled to that TDU. That is, the new TDU may change the characteristics of the sub-array to which it is attached, such as the amplitude and/or phase. Thus, a process similar to the process disclosed above for replacement of an antenna sub-array can be utilized to compensate for this change.

Figure 7B:
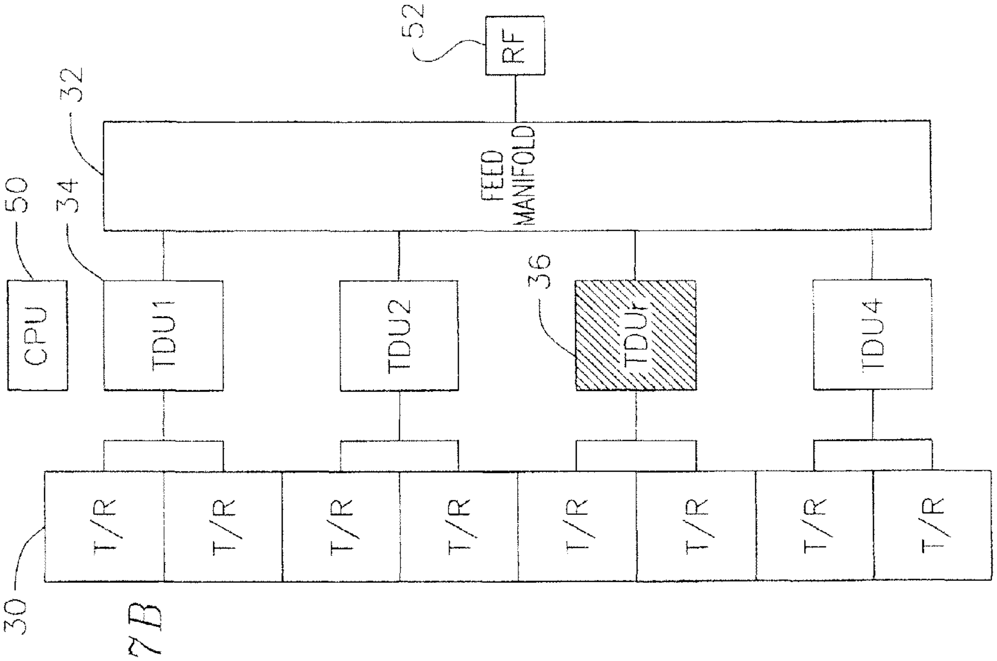
FIGS. 7A and 7B show an alternative replacement configuration in accordance with an exemplary embodiment of the present invention.
Figure 7A:
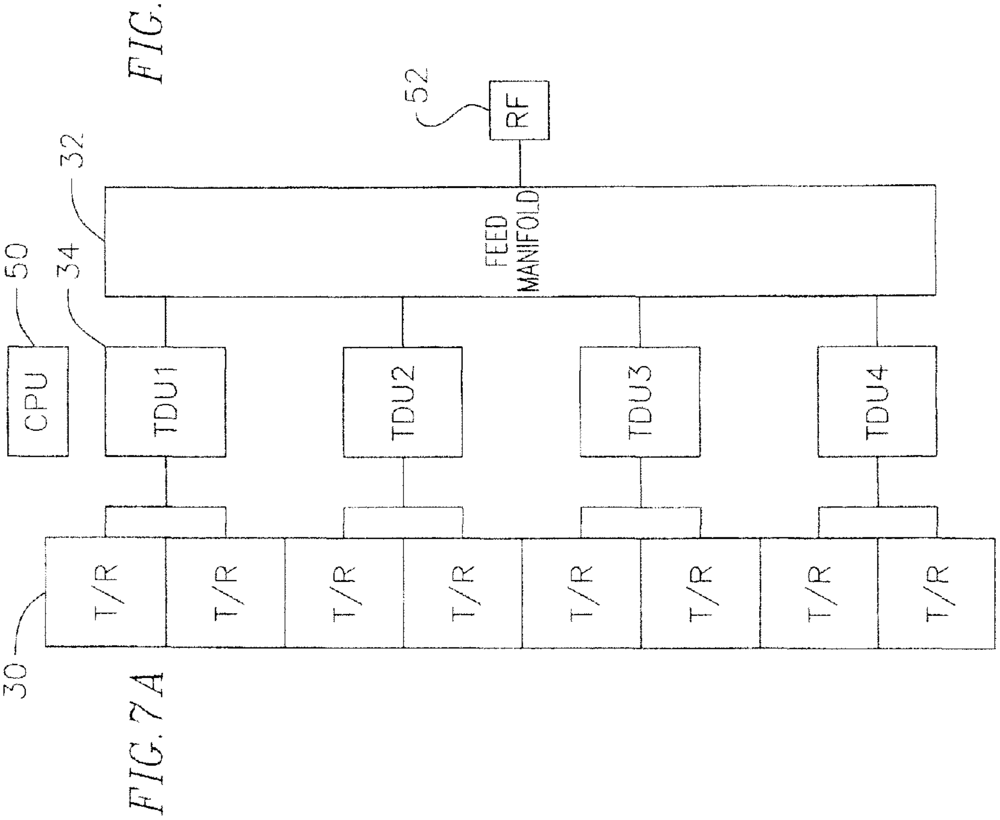

FIGS. 7A and 7B illustrate another exemplary embodiment of the invention, including a radio frequency (RF) unit 52, a feed manifold 32, a plurality of TDUs 34, a plurality of T/R sub-arrays 30, and a control unit 50. The RF unit 52 includes a receiver and an exciter. In some embodiments, the receiver of the RF unit 52 includes elements such as an amplifier, a mixer, and various RF filters, and converts the received signal into its in-phase and quadrature (I/Q) components, to be processed later. For example, an analog to digital (A/D) converter may be utilized for converting the I/Q signals into digital signals for further processing by a DSP. In some embodiments, the exciter of the RF unit 52 includes elements such as a signal generator and power amplifier for driving the antenna. The RF unit 52 is further coupled to a feed manifold 32, which routes RF signals between the RF unit 52 and the TDUs 34, which thereby are coupled to the T/R elements 30.

According to some embodiments, the control unit 50 is a stand-alone processor, and in other embodiments, the control unit 50 is a beam steering computer for controlling the antenna and steering a beam. The control unit 50 may be within the antenna unit, or it may be external to it, combining function with other various tasks as required in an application. The control unit 50 may be a microprocessor, a CPU, a state machine, a programmable gate array, or another device for controlling input/output operations of peripheral components and performing calculations, known to those skilled in the art for controlling the calculations of the correction coefficients and for sending and receiving and/or data to or from one or more of the components of the ESA antenna.

TDUr 36 of FIG. 7B is shown replacing TDU3 of FIG. 7A. As such, the resulting need for calibration would be performed in a fashion similar to that depicted in FIGS. 2 and 3. That is, the determination of compensation coefficients in transmit and/or receive for each of the T/R antenna sub-arrays 30 that are coupled to the replaced TDU 36 would be executed as described above. One skilled in the art will comprehend that embodiments of the invention are not limited to replacement of a TDU, but rather apply to replacement of any portion of the feed network, such as a cable, an interconnect, or the feed manifold 32. Further, alternate embodiments utilize not only calibration of the T/R sub-arrays 30, but if the phase and amplitude characteristics of the TDU are tunable, similar methods may be utilized to calibrate the TDU or other portions of the feed network.

Figure 8:
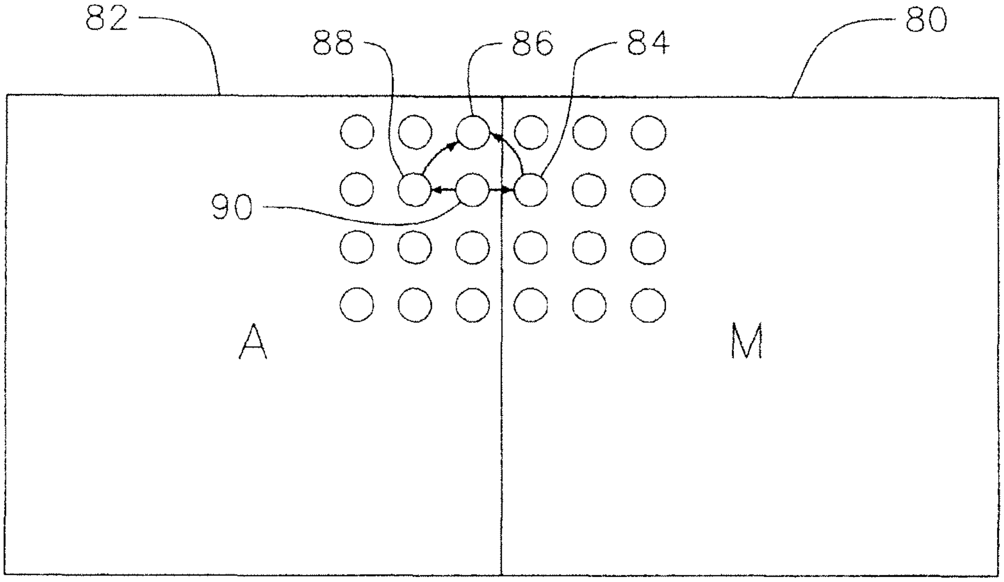
FIG. 8 shows mutual coupled signal representations for recalibration of an antenna having high isolation between antenna elements according to an exemplary embodiment of the present invention.

FIG. 8 illustrates another exemplary embodiment of the present invention, wherein calibration of a replaced sub-array 80 is accomplished with respect to antenna elements within a single calibrated sub-array 82. In this embodiment, sub-array 82 is configured to have suitable isolation between antenna elements such that the circuit driver that generates a high-power signal transmission from one antenna element substantially does not interfere with the driver circuits for transmission or reception of other antenna elements in the same sub-array 82. Thus, to calibrate antenna element 84 in sub-array 80 in receive mode, a signal is transmitted along mutual coupling paths from antenna element 90 in sub-array 82 to antenna elements 88 in sub-array 82 and 84 in sub-array 80. Similarly, to calibrate antenna element 84 in sub-array 80 in transmit mode, signals are transmitted along mutual coupling paths from antenna 84 in sub-array 80 and from antenna element 88 in sub-array 82 to antenna element 86 in sub-array 82. Thereby, utilizing the methods described above, calibration of antenna element 84 in sub-array 80 can be accomplished in both transmit and receive modes relative to antenna elements 86, 88, and 90, each within the same sub-array 82.

Although the present invention has been described with reference to the exemplary embodiments thereof, it will be appreciated by those skilled in the art that it is possible to modify and change the present invention in various ways without departing from the spirit and scope of the present invention as set forth in the following claims. For example, any cable, set of cables, or the feed manifold itself could be replaced and recalibrated in the field using the approach in accordance with the present invention.

What is claimed is:

1. A method of calibrating a modular phased array antenna, the modular phased array antenna comprising a replaced sub-array, and a plurality of sub-arrays, each sub-array comprising a plurality of antenna elements, the method comprising:

determining two or more complex correction coefficients for correcting respective phases and amplitudes of two or more antenna elements in the replaced sub-array;

generating an average correction coefficient of the two or more complex correction coefficients; and applying the average correction coefficient to a portion of the plurality of the antenna elements in the replaced sub-array to bring the replaced sub-array into calibration with the plurality of sub-arrays.

2. The method of claim 1, wherein each of the two or more antenna elements in the replaced sub-array comprises a time delay unit (TDU) coupled to the replaced sub-array, wherein the TDU is configured to change characteristics of the replaced sub-array.

3. The method of claim 1, wherein:

the determining the two or more complex correction coefficient comprises:

determining first correction coefficients for a first portion of the antenna elements in the replaced sub-array; and calculating an average correction coefficient corresponding to the first correction coefficients, and wherein:

the applying the average correction coefficient comprises applying the average correction coefficient to a second portion of the antenna elements in the replaced sub-array.

4. The method of claim 1, wherein:

a first antenna element of the replaced sub-array has a first receiving phase and gain and a first transmitting phase and gain;

a second sub-array of the sub-arrays comprises a second antenna element of the antenna elements, the second antenna element having a second transmitting phase and gain; and a third sub-array of the sub-arrays comprises a third antenna element of the antenna elements, the third antenna element having a third receiving phase and gain, the replaced sub-array being a different sub-array than the second sub-array and the third sub-array, and wherein the determining of the correction coefficients comprises:

transmitting a first signal along a first mutual coupling path having a first mutual coupling characteristic from the second antenna element to the third antenna element, and along a second mutual coupling path having a second mutual coupling characteristic from the second antenna element to the first antenna element; and determining a receiving correction coefficient for the first antenna element corresponding to a difference between the first signal received by the first antenna element and the first signal received by the third antenna element.

5. The method of claim 4, wherein the first mutual coupling characteristic is substantially identical to the second mutual coupling characteristic.

6. The method of claim 4, wherein the applying of the average correction coefficient comprises applying the average correction coefficient to the first plurality of the antenna elements in the replaced sub-array.

7. The method of claim 4, wherein the second sub-array is a different sub-array other than the third sub-array.

8. The method of claim 4, wherein:

the first signal received by the first antenna element corresponds to changes in an amplitude and a phase of the first signal corresponding to a change of phase and a change of gain caused by each of the second transmitting phase and gain, the first mutual coupling characteristic, and the first receiving phase and gain; and the first signal received by the third antenna element corresponds to changes in an amplitude and a phase of the first signal corresponding to a change of phase and a change of gain caused by each of the second transmitting phase and gain, the second mutual coupling characteristic, and the third receiving phase and gain.

9. The method of claim 8, wherein the first mutual coupling characteristic is substantially identical to the second mutual coupling characteristic.

10. The method of claim 4, wherein:

a fourth sub-array of the sub-arrays comprises a fourth antenna element of the antenna elements, the fourth antenna element having a fourth transmitting phase and gain; and a fifth sub-array of the sub-arrays comprises a fifth antenna element of the antenna elements, the fifth antenna element having a fifth receiving phase and gain, the replaced sub-array being a different sub-array other than the fourth sub-array and the fifth sub-array, wherein the determining the correction coefficient further comprises:

transmitting a second signal along a third mutual coupling path having a third mutual coupling characteristic from the fourth antenna element to the fifth antenna element;

transmitting a third signal along a fourth mutual coupling path having a fourth mutual coupling characteristic from the first antenna element to the fifth antenna element; and determining a transmitting correction coefficient for the first antenna element corresponding to a difference between the second signal received by the fifth antenna element and the third signal received by the fifth antenna element.

11. The method of claim 10, wherein:

the second signal received by the fifth antenna element corresponds to changes in an amplitude and a phase of the second signal corresponding to a change of phase and a change of gain caused by each of the fourth transmitting phase and gain, the second mutual coupling characteristic, and the fifth receiving phase and gain; and the third signal received by the fifth antenna element corresponds to changes in an amplitude and a phase of the third signal corresponding to a change of phase and a change of gain caused by each of the first transmitting phase and gain, the third mutual coupling characteristic, and the fifth receiving phase and gain.

12. An electronically scanned array antenna comprising:

an antenna array comprising a plurality of sub-arrays and a replaced sub-array, each sub-array comprising a plurality of antenna elements;

a feed network for transmitting signals to or from respective ones of the sub-arrays; and a control unit for determining two or more complex correction coefficients for correcting respective phases and amplitudes of two or more antenna elements in the replaced sub-array, the control unit configured to calculate an average correction coefficient of the two or more complex correction coefficients, and apply the average correction coefficient to a portion of the plurality of the antenna elements in the replaced sub-array to bring the replaced sub-array into calibration with the plurality of sub-arrays.

* * * * *